UNITED STATES PATENT OFFICE.

ELIZABETH BELLINGER, OF MOHAWK, NEW YORK.

COMPOSITION FOR KINDLING FIRES.

Specification forming part of Letters Patent No. 26,408, dated December 13, 1859.

*To all whom it may concern:*

Be it known that I, Mrs. ELIZABETH BELLINGER, of Mohawk, in the county of Herkimer and State of New York, have invented a new and useful Ignitible Paste for Fire-Kindlers; and I do hereby declare that the following is a full, clear, and exact description of the same.

The nature of my invention consists of a new composition of inflammable gums or rosin and wax combined with friction-match paste placed on fire-kindlers, which composition is very inflammable, and is thus well suited to ignite the kindling material effectually and rapidly, and it does not become injured by time or climate, thus rendering it well adapted for exportation from place to place, and for long preservation.

To enable others skilled in the art to make and use my composition, I will proceed to describe it as clearly and succinctly as possible.

I take "kauri gum," eight parts, by weight, crude camphor, four parts, by weight, and pulverize them in any known way, such as by pounding the kauri gum in a mortar and rolling the camphor with a pin on a board. I now mix those two substances together and stir them among two parts, by weight, of melted beeswax (or myrtle-wax) in a suitable vessel until the whole are well incorporated together. Care must be exercised not to have the melted wax too hot, and to prevent this result I place the wax in a water bath, when the gums are stirred in. When these substances are thus completely mixed the paste so formed is ready for use. I color it with vermilion, and sometimes add a little balsam of tolu to impart a fragrant odor to the gum when kindled; but these are not essential.

This gum paste in its soft state is now put on the common blocks of manufactured kindling material in small spots, one on each, and in a suitable place, and then on the top of this the common friction-match paste is placed in spots or patches in a similar manner. When dry the kindlers so made are ready for use as follows: Take a piece of sand-paper or other like material and rub it rapidly across the surface of the match-paste on the kindler-block. It ignites, and its heat quickly kindles the inflammable gum paste composition described, which inflames the kindler-block with certainty in all cases. The wax enables the inflammable gums to adhere to the kindler-block, and it also protects them and preserves their properties, as it is a most efficient antiseptic.

The material of which the kindler-block is made need not be described, as it is well known, being composed of sawdust or such like substance agglutinated together. The friction-match paste placed on the top of the gum-paste need not be particularly described, as it is well known, and may be made of niter, peroxide of lead, and chlorate of potash; but I use that which L. Bellinger & Co. employ on their matches without sulphur. My gum paste is suitable for any of the friction-match-paste compositions that may be used.

The common manufactured fire-kindlers, made by simply having a friction-match paste placed direct on the block, are liable to miss catching fire, owing to the inflammable agent which is usually combined with the sawdust, &c., becoming volatilized by exposure or age, or by dampness. It requires a somewhat intense heat to ignite the blocks of the kindler, and this is supplied with certainty by my gum-paste composition. As soon as the match-paste on the top is ignited the heat generated melts the wax, the inflammable gums take fire and burn with such intensity as to kindle the block in every case.

Having thus described the invention, I claim—

The inflammable gum paste composed of kauri gum, camphor, and wax, in about the proportions stated, when combined with friction-match paste placed on kindlers for fires, in the manner and for the purposes set forth.

ELIZABETH BELLINGER.

Witnesses:
CHARLES MYERS,
LEONARD A. B. ROOT.